United States Patent
Hegna et al.

(10) Patent No.: US 7,881,159 B2
(45) Date of Patent: Feb. 1, 2011

(54) SEISMIC STREAMERS WHICH ATTENTUATE LONGITUDINALLY TRAVELING WAVES

(75) Inventors: Stian Hegna, Høvik (NO); Øyvind Hillesund, Nesbru (NO)

(73) Assignee: PGS Geophysical AS, Lysaker (NO)

( * ) Notice: Subject to any disclaimer, the term of this patent is extended or adjusted under 35 U.S.C. 154(b) by 0 days.

(21) Appl. No.: 11/640,657

(22) Filed: Dec. 18, 2006

(65) Prior Publication Data

US 2008/0144434 A1    Jun. 19, 2008

(51) Int. Cl.
*G01V 1/20* (2006.01)
*G01V 1/38* (2006.01)

(52) U.S. Cl. .................... 367/173; 367/20; 702/17

(58) Field of Classification Search ............ 367/20, 367/117, 153–154, 173; 181/112, 110
See application file for complete search history.

(56) References Cited

U.S. PATENT DOCUMENTS

| | | | | |
|---|---|---|---|---|
| 3,713,085 | A * | 1/1973 | Laurent et al. | 367/154 |
| 3,720,909 | A * | 3/1973 | Sikora | 367/173 |
| 3,789,353 | A * | 1/1974 | Hunter et al. | 367/132 |
| 4,078,223 | A * | 3/1978 | Strange | 367/58 |
| 4,300,218 | A * | 11/1981 | Kruka et al. | 367/165 |
| 4,481,611 | A | 11/1984 | Burrage | |
| 4,521,908 | A * | 6/1985 | Miyaji et al. | 381/92 |
| 4,536,862 | A * | 8/1985 | Sullivan et al. | 367/153 |
| 4,618,949 | A * | 10/1986 | Lister | 367/171 |
| 4,649,529 | A * | 3/1987 | Avicola | 367/149 |
| 4,689,777 | A * | 8/1987 | Roever | 367/153 |
| 4,692,907 | A * | 9/1987 | Jubinski | 367/20 |
| 4,821,241 | A * | 4/1989 | Berglund | 367/20 |
| 4,910,715 | A * | 3/1990 | Savit | 367/20 |
| 4,974,213 | A * | 11/1990 | Siwecki | 367/88 |
| 5,046,055 | A * | 9/1991 | Ruffa | 367/154 |
| 5,214,614 | A * | 5/1993 | Baule | 367/58 |
| 5,231,252 | A * | 7/1993 | Sansone | 181/122 |
| 5,251,183 | A * | 10/1993 | McConnell et al. | 367/21 |
| 5,274,603 | A * | 12/1993 | Zibilich et al. | 367/20 |
| 5,309,412 | A * | 5/1994 | Bourgeois | 367/154 |
| 5,384,753 | A * | 1/1995 | Sanders | 367/163 |
| 5,521,885 | A * | 5/1996 | Harvey | 367/154 |
| 5,600,608 | A * | 2/1997 | Weiss et al. | 367/20 |
| 5,654,937 | A * | 8/1997 | Striffler | 367/13 |

(Continued)

FOREIGN PATENT DOCUMENTS

GB    2 435 125    5/1973

(Continued)

OTHER PUBLICATIONS

Schoenberger et al. Hydrophone Streamer Noise. Geophysics. vol. 39. No. 6. Dec. 1974. pp. 781-793.*

(Continued)

*Primary Examiner*—Mark Hellner
*Assistant Examiner*—Ari M Diacou
(74) *Attorney, Agent, or Firm*—E. Eugene Thigpen; Richard A. Fagin (57) ABSTRACT

A seismic streamer includes at least one array of sensors each disposed in a sensor holder at longitudinally spaced apart locations. A longitudinal orientation of at least one sensor or at least one sensor holder is different from that of the other sensors along the length of the array.

31 Claims, 6 Drawing Sheets

U.S. PATENT DOCUMENTS

| | | | |
|---|---|---|---|
| 5,745,436 A * | 4/1998 | Bittleston | 367/20 |
| 5,808,965 A * | 9/1998 | Hull | 367/13 |
| 5,943,293 A * | 8/1999 | Luscombe et al. | 367/20 |
| 5,963,507 A * | 10/1999 | Barr et al. | 367/15 |
| 6,021,090 A * | 2/2000 | Gaiser et al. | 367/15 |
| 6,108,267 A * | 8/2000 | Pearce | 367/20 |
| 6,111,816 A * | 8/2000 | Chiang et al. | 367/7 |
| 6,160,763 A | 12/2000 | Cole | |
| 6,181,642 B1 * | 1/2001 | Coates et al. | 367/25 |
| 6,253,627 B1 * | 7/2001 | Lee et al. | 73/862.393 |
| 6,477,111 B1 * | 11/2002 | Lunde et al. | 367/20 |
| 6,488,116 B2 * | 12/2002 | Bailey | 181/108 |
| 6,512,980 B1 * | 1/2003 | Barr | 702/1 |
| 6,607,050 B2 * | 8/2003 | He et al. | 181/110 |
| 6,614,723 B2 * | 9/2003 | Pearce et al. | 367/154 |
| 6,662,899 B2 * | 12/2003 | Norris et al. | 181/102 |
| 6,739,423 B2 * | 5/2004 | Tashiro et al. | 181/105 |
| 6,837,332 B1 * | 1/2005 | Rodney | 181/105 |
| 6,853,604 B2 * | 2/2005 | Spackman et al. | 367/154 |
| 6,876,599 B1 * | 4/2005 | Combee | 367/21 |
| 7,298,672 B1 * | 11/2007 | Tenghamn et al. | 367/176 |
| 2002/0015359 A1 * | 2/2002 | Joh et al. | 367/154 |
| 2002/0125376 A1 * | 9/2002 | Karniadakis et al. | 244/204 |
| 2002/0175020 A1 * | 11/2002 | Corrigan et al. | 181/111 |
| 2004/0017731 A1 * | 1/2004 | Halvorsen et al. | 367/166 |
| 2004/0042341 A1 | 3/2004 | Tenghamn | |
| 2004/0066707 A1 * | 4/2004 | Tenghamn et al. | 367/15 |
| 2005/0194201 A1 * | 9/2005 | Tenghamn et al. | 181/112 |
| 2006/0023568 A1 * | 2/2006 | Fernihough et al. | 367/20 |
| 2006/0133202 A1 * | 6/2006 | Tenghamn | 367/24 |
| 2006/0193203 A1 * | 8/2006 | Tenghamn et al. | 367/20 |
| 2007/0258319 A1 * | 11/2007 | Ronnekleiv et al. | 367/20 |
| 2007/0258320 A1 * | 11/2007 | Harrick et al. | 367/20 |
| 2007/0258321 A1 * | 11/2007 | Tenghamn | 367/20 |
| 2007/0265786 A1 * | 11/2007 | Ozdemir et al. | 702/17 |

FOREIGN PATENT DOCUMENTS

GB     1 511 763     5/1976

OTHER PUBLICATIONS

Giles et al. Streamer Noise Reduction with Manufacturing Techniques. First Break. vol. 7. No. 7. pp. 287-292. Jul. 1989.*

Stephen Jennings, British Search Report, Mar. 5, 2008.

* cited by examiner

SEISMIC STREAMERS WHICH ATTENUATE LONGITUDINALLY TRAVELING WAVES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic survey apparatus and methods. More specifically, the invention relates to structures for marine seismic streamers that have reduced noise induced by effects of towing such streamers in the water.

2. Background Art

In marine seismic surveying, a seismic vessel travels on the surface of a body of water such as a lake or the ocean. The seismic vessel typically contains seismic data acquisition equipment, which includes devices such as navigation control, seismic source control, seismic sensor control, and signal recording devices. The seismic acquisition equipment causes a seismic source towed in the body of water, by the seismic vessel or another vessel, to actuate at selected times. The seismic source may be any type well known in the art of seismic acquisition, including air guns or water guns, or most commonly, arrays of air guns. Seismic streamers, also called seismic cables, are elongate cable-like structures that are towed in the body of water by the seismic survey vessel or by another vessel. Typically, a plurality of seismic streamers is towed behind the seismic vessel laterally spaced apart from each other. The seismic streamers contain sensors to detect the seismic wavefields initiated by the seismic source and reflected from acoustic impedance boundaries in the subsurface Earth formations below the water bottom.

Conventionally, seismic streamers contain pressure-responsive sensors such as hydrophones, but seismic streamers have also been proposed that contain particle motion sensors, such as geophones, in addition to hydrophones. The sensors are typically located at selected intervals along the length of seismic streamers.

Seismic streamers also include electronic components, electrical wiring and may include other types of sensors. Seismic streamers are typically assembled from sections, each section being approximately 75 meters in length. A number of such sections are joined end to end, and can extend the assembled streamer to a total length of many thousands of meters. Position control devices, such as depth controllers, paravanes, and tail buoys are affixed to the streamer at selected positions and are used to regulate and monitor the movement of the streamer in the water. During operation, the seismic sources and streamers are typically submerged at a selected depth in the water. The seismic sources are typically operated at a depth of 5-15 meters below the water surface and the seismic streamers are typically operated at a depth of 5-40 meters.

A typical streamer section consists of an external jacket, connectors, spacers, and strength members. The external jacket is formed from a flexible, acoustically transparent material such as polyurethane and protects the interior of the streamer section from water intrusion. The connectors are disposed at the ends of each streamer section and link the section mechanically, electrically and/or optically to adjacent streamer sections and, therefore, ultimately link it to the seismic towing vessel. There is at least one, and are usually two or more such strength members in each streamer section that extend the length of each streamer section from one end connector to the other. The strength members provide the streamer section with the capability to carry axial mechanical load. A wire bundle or cable also extends the length of each streamer section, and can contain electrical power conductors and electrical data communication wires. In some instances, optical fibers for signal communication are included in the wire bundle.

Typically, hydrophones or groups of hydrophones are located within the streamer section. The hydrophones are frequently mounted within corresponding spacers for protection. The distance between hydrophone containing spacers is ordinarily about 0.7 meters. A hydrophone group, typically comprising 16 hydrophones, thus extends for a length of about 12.5 meters. The hydrophones in a group are typically connected in series to cancel effects of certain types of noise to which the streamer may be exposed. The interior of the seismic streamers is typically filled with a void filling material to provide buoyancy and desired acoustic properties. Many seismic streamers have been filled with a liquid, such as oil or kerosene.

Ideally, in a streamer moving at constant speed, all the streamer components including the jacket, the connectors, the spacers, the strength members, wire bundle, sensors and liquid void filling material all move at the same constant speed and do not move relative to each other. Under actual movement conditions, however, transient motion of the streamers takes place, such transient motion being caused by events such as pitching and heaving of the seismic vessel, movement of the paravanes and tail buoys attached to the streamers, strumming of the towing cables attached to the streamers caused by vortex shedding on the cables, and operation of depth-control devices located on the streamers. Any of the foregoing types of transient motion can cause transient motion (stretching) of the strength members. Transient motion of the strength members displaces the spacers or connectors, causing pressure fluctuations in the liquid void filling material that are detected by the hydrophones. Pressure fluctuations radiating away from the spacers or connectors also cause the flexible outer jacket to compress in and bulge out in the form of a traveling wave, giving the phenomenon "bulge waves" its name.

In addition, there are other types of noise, often called "flow noise", which can affect the quality of the seismic signal detected by the hydrophones. For example, vibrations of the seismic streamer can cause extensional waves in the outer jacket and resonance transients traveling down the strength members. A turbulent boundary layer created around the outer jacket of the streamer by the act of towing the streamer can also cause pressure fluctuations in the liquid core-filling material. In liquid filled streamer sections, the extensional waves, resonance transients, and turbulence-induced noise are typically much smaller in amplitude than the bulge waves, however they do exist and affect the quality of the seismic signals detected by the hydrophones. Bulge waves are usually the largest source of vibration noise because these waves travel in the liquid core material filling the streamer sections and thus act directly on the hydrophones.

It is known in the art to replace the liquid core material in a streamer section with a soft, flexible solid core material, such as gel. The introduction of a softer, flexible solid material may block the development of bulge waves compared to a liquid core material. Using a soft, flexible material will eliminate a substantial portion of the problem with "bulge waves", but the so-called Poisson effect from the strength members can increase. Because of the relatively high tensile stiffness of the strength members, transients generally travel along the strength members at velocities near to or greater than that of the sound velocity in water, such velocities typically in the range of 1000 to 1500 meters per second. The actual velocity of transients along the strength members depends mainly on the elastic modulus of the strength member material and the tension applied to the streamer as it is towed in the water. The lower the elastic modulus the more compliant the streamer will be, and thus the more transient energy it will dissipate as heat and the less will pass through the strength member. Special elastic sections are normally placed at either end of a streamer cable to reduce the effects of transients.

There is still a need to further improve the attenuation of longitudinal waves transmitted through the strength members of marine seismic streamers.

SUMMARY OF THE INVENTION

One aspect of the invention is a seismic streamer. A seismic streamer according to this aspect of the invention includes at least one array of sensors each disposed in a holder at longitudinally spaced apart locations. Each sensor in the at least one array may be more sensitive to pressure waves traveling one longitudinal direction than in an opposed direction. At least one sensor or at least one sensor holder is oriented differently than the others in the array.

A seismic streamer according to another aspect of the invention includes a jacket covering an exterior of the streamer and at least one strength member extending along the length of the jacket and disposed inside the jacket. At least one array of sensors is disposed inside the jacket along the strength member. Each sensor in the at least one array is disposed in a respective sensor holder. Each sensor holder is configured to expose the sensor therein to the interior of the jacket in only one longitudinal direction. The holders are arranged such that at least one holder is longitudinally oriented differently than the other holders. In some embodiments, the holders are oriented in a pattern that will provide optimum symmetry after array forming. An acoustically transparent material fills the void spaces in the interior of the jacket.

Other aspects and advantages of the invention will be apparent from the description and claims which follow.

DETAILED DESCRIPTION

Figure 1:
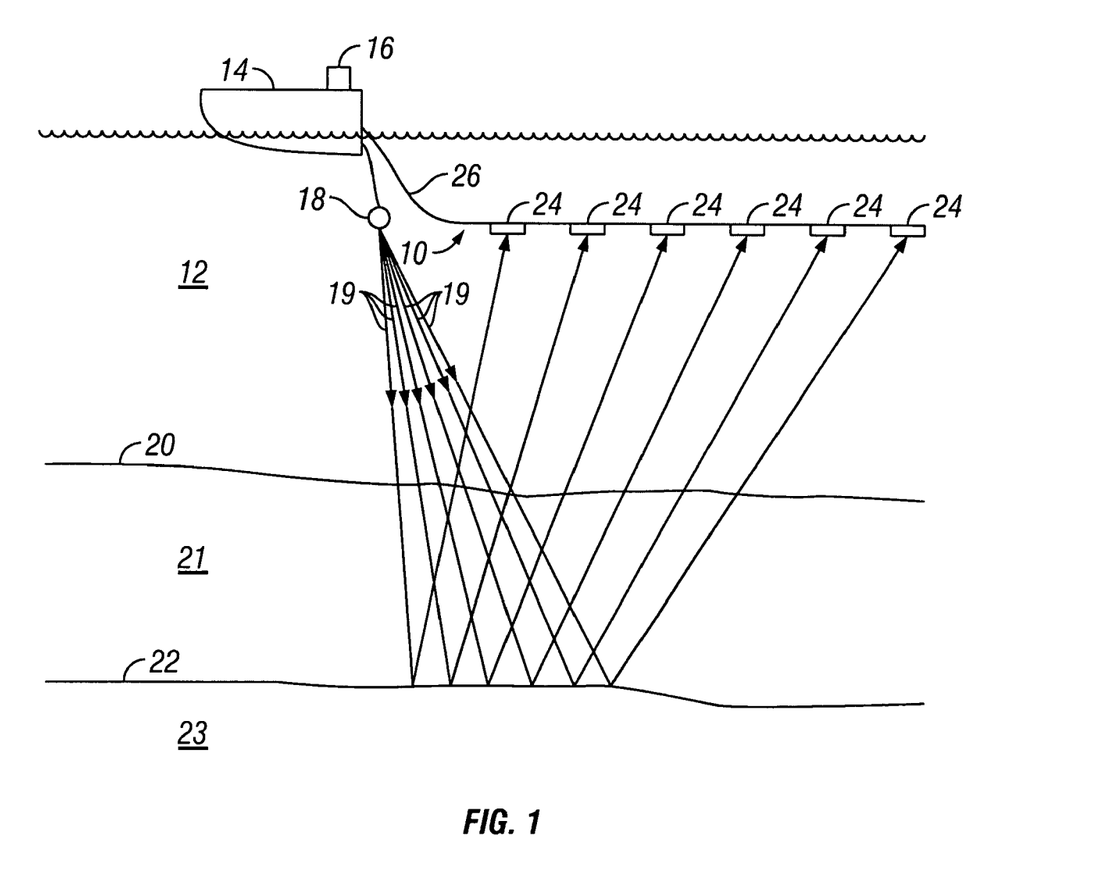
FIG. 1 shows typical marine seismic data acquisition using a streamer according to one embodiment of the invention.
Figure 3:
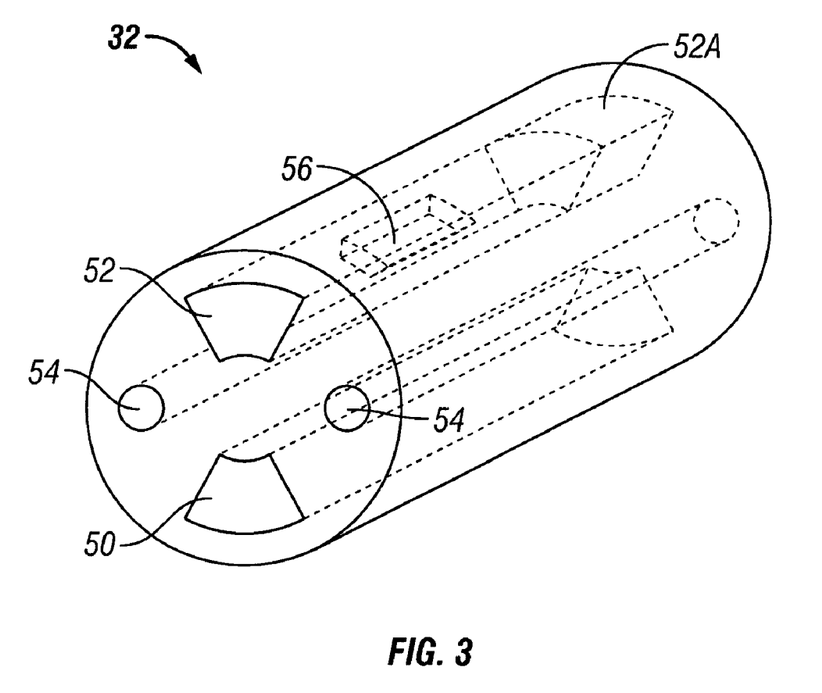
FIGS. 3 and 4 show various embodiments of a sensor spacer used in a streamer according to the invention.
Figure 4:
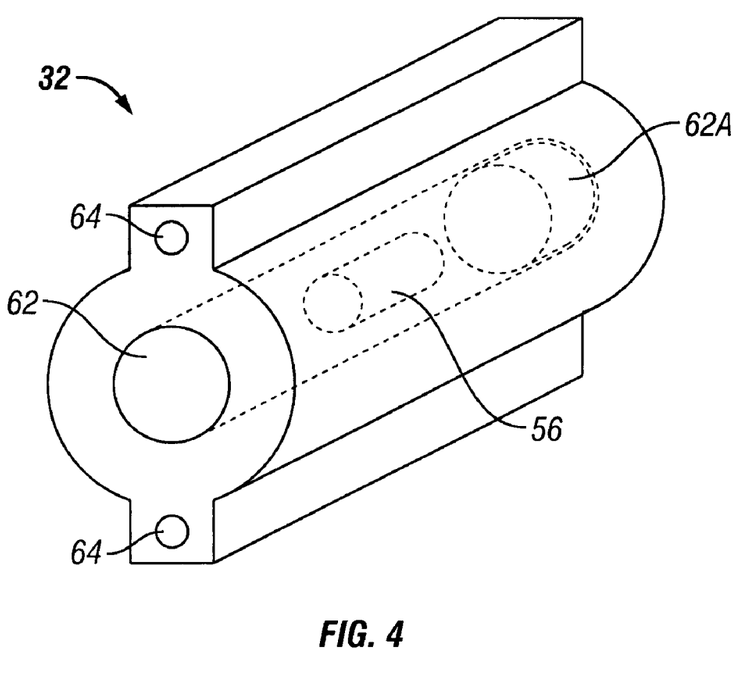
Figure 5:
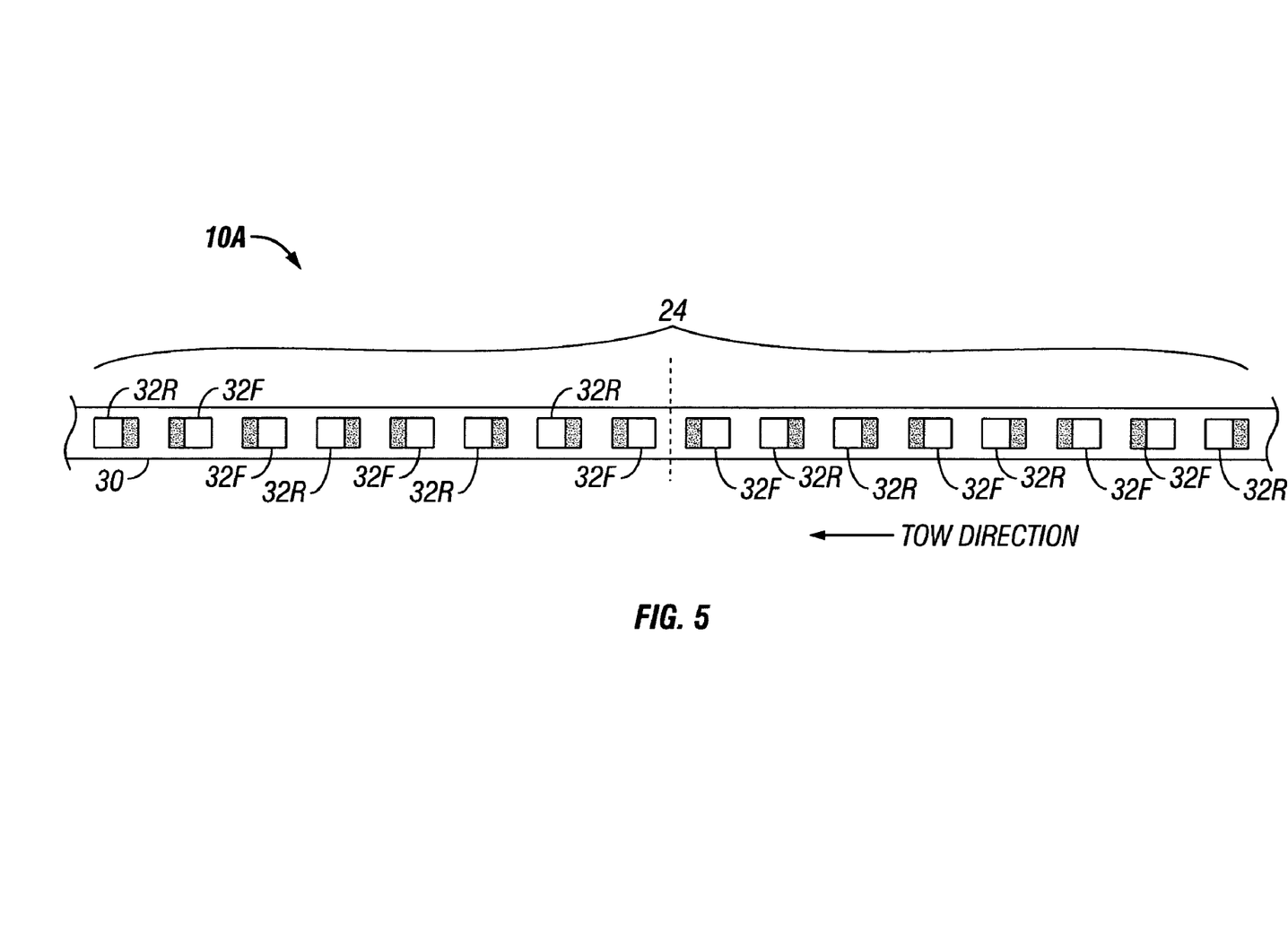
FIG. 5 shows an array of sensors in a streamer.

FIG. 1 shows an example marine seismic data acquisition system as it is typically used on acquiring seismic data. A seismic vessel 14 moves along the surface of a body of water 12 such as a lake or the ocean. The marine seismic survey is intended to detect and record seismic signals related to structure and composition of various subsurface formations 21, 23 below the water bottom 20. The seismic vessel 14 includes source actuation, data recording and navigation equipment, shown generally at 16, referred to for convenience as a "recording system." The seismic vessel 14, or a different vessel (not shown), can tow one or more seismic energy sources 18, or arrays of such sources in the water 12. The seismic vessel 14 or a different vessel tows at least one seismic streamer 10 near the surface of the water 12. The streamer 10 is coupled to the vessel 14 by a lead in cable 26. A plurality of sensor arrays 24 are disposed at spaced apart locations along the streamer 10. The sensor arrays 24, as will be explained in more detail below with reference to FIGS. 3 through 5, are formed by mounting a seismic sensor inside each one of a plurality of sensor spacers and disposing the sensor spacers along the streamer in a particular arrangement.

During operation, certain equipment (not shown separately) in the recording system 16 causes the source 18 to actuate at selected times. When actuated, the source 18 produces seismic energy 19 that emanates generally outwardly from the source 18. The energy 19 travels downwardly, through the water 12, and passes, at least in part, through the water bottom 20 into the formations 21, 23 below. Seismic energy 19 is at least partially reflected from one or more acoustic impedance boundaries 22 below the water bottom 20, and travels upwardly whereupon it may be detected by the sensors in each sensor array 24. Structure of the formations 21, 23, among other properties of the Earth's subsurface, can be inferred by travel time of the energy 19 and by characteristics of the detected energy such as its amplitude and phase.

Figure 2:
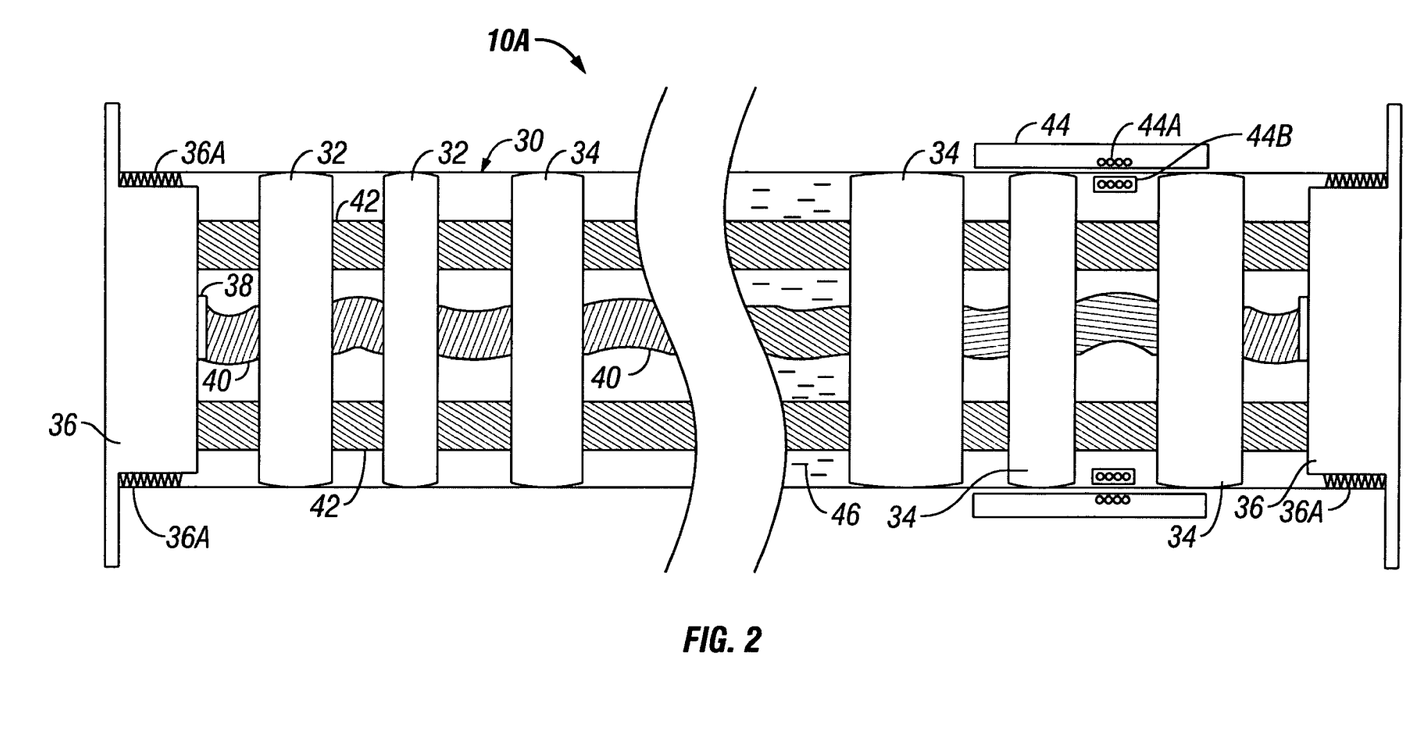
FIG. 2 shows a cut away view of one embodiment of a streamer segment according to the invention.

Having explained the general method of operation of a marine seismic streamer, an example embodiment of a streamer section according to the invention will be explained with reference to FIG. 2. FIG. 2 is a cut away view of a portion (segment) 10A of a typical marine seismic streamer (10 in FIG. 1). A streamer as shown in FIG. 1 may extend behind the seismic vessel (14 in FIG. 1) for several kilometers, and is typically made from a plurality of streamer segments 10A as shown in FIG. 2 connected end to end behind the vessel (14 in FIG. 1).

The streamer segment 10A in the present embodiment may be about 75 meters overall length. A streamer such as shown at 10 in FIG. 1 thus may be formed by connecting a selected number of such segments 10A end to end. The segment 10A includes a jacket 30, which in the present embodiment can be made from 3.5 mm thick transparent polyurethane and has a nominal external diameter of about 62 millimeters. In each segment 10A, each axial end of the jacket 30 may be terminated by a coupling/termination plate 36. The coupling/termination plate 36 may include rib elements 36A on an external surface of the coupling/termination plate 36. Such surface is inserted into the end of the jacket 30, so as to seal against the inner surface of the jacket 30 and to grip the coupling/termination plate 36 to the jacket 30 when the jacket 30 is secured by and external clamp (not shown). In the present embodiment, two strength members 42 can be coupled to the interior of each coupling/termination plate 36 and can extend the length of the segment 10A. In a particular implementation of the invention, the strength members 42 may be made from a fiber rope made from a fiber sold under the trademark VECTRAN, which is a registered trademark of Hoechst Celanese Corp., New York, N.Y. The strength members 42 transmit axial load along the length of the segment 10A. When one segment 10A is coupled end to end to another such segment (not shown in FIG. 2), the mating coupling/termination plates 36 are coupled together using any suitable connector, so that the axial force is transmitted through the coupling/termination plates 36 from the strength members 42 in one segment 10A to the strength member in the adjoining segment.

The segment 10A can include a number of buoyancy spacers 34 disposed in the jacket 30 and coupled to the strength members 42 at spaced apart locations along their length. The buoyancy spacers 34 may be made from foamed polyurethane or other suitable, selected density material. The buoyancy spacers 34 have a density selected to provide the segment 10A preferably with approximately the same overall density as the water (12 in FIG. 1), so that the streamer (10 in FIG. 1) will be substantially neutrally buoyant in the water (12 in FIG. 1). As a practical matter, the buoyancy spacers 34 provide the segment 10A with an overall density very slightly less than that of fresh water. Appropriate overall density may then be adjusted in actual use by adding selected buoyancy spacers 34 and fill media having suitable specific gravity.

The segment 10A includes a generally centrally located conductor cable 40 which can include a plurality of insulated electrical conductors (not shown separately), and may include one or more optical fibers (not shown). The cable 40 conducts electrical and/or optical signals from the sensors (which will be further explained below with reference to FIGS. 3 and 4) to the recording system (16 in FIG. 1). The cable 40 may in some implementations also carry electrical power to various signal processing circuits (not shown separately) disposed in one or more segments 10A, or disposed elsewhere along the streamer (10 in FIG. 1). The length of the conductor cable 40 within a cable segment 10A is generally longer than the axial length of the segment 10A under the largest expected axial stress on the segment 10A, so that the electrical conductors and optical fibers in the cable 40 will not experience any substantial axial stress when the streamer 10 is towed through the water by a vessel. The conductors and optical fibers in the cable 40 may be terminated in a connector 38 disposed in each coupling/termination plate 36 so that when the segments 10A are connected end to end, corresponding electrical and/or optical connections may be made between the electrical conductors and optical fibers in the conductor cable 40 in adjoining segments 10A.

Sensors, which in the present embodiment may be hydrophones, can be disposed inside sensor holders, shown in FIG. 2 generally at 32. The hydrophones in the present embodiment can be of any type known to those of ordinary skill in the art, including but not limited to those sold under model number T-2BX by Teledyne Geophysical Instruments, Houston, Tex.

In the present embodiment, and as will be explained below with reference to FIG. 5, each segment 10A may include 96 such hydrophones, disposed in arrays. Each such array may include sixteen individual hydrophones connected in electrical series (or optical series if the sensors are optical sensors). It should be understood that in other implementations, the equivalent of a series coupled array may be effected by individually recording the signals from each sensor and summing the recorded signals.

In a particular implementation of the invention, there are thus six such arrays, spaced apart from each other at about 12.5 meters. The spacing between individual hydrophones in each array should be selected so that the axial span of the array is at most equal to about one half the wavelength of the highest frequency seismic energy intended to be detected by the streamer (10 in FIG. 1). It should be clearly understood that the types of sensors used, types of sensor spacers/holders used, the electrical and/or optical connections used, the number of such sensors, and the spacing between such sensors are only used to illustrate one particular embodiment of the invention, and are not intended to limit the scope of this invention. In other embodiments, the sensors may be particle motion sensors such as geophones or accelerometers. A marine seismic streamer having particle motion sensors is described in U.S. patent application Ser. No. 10/233,266, filed on Aug. 30, 2002, entitled, Apparatus and Method for Multicomponent Marine Geophysical Data Gathering, assigned to an affiliated company of the assignee of the present invention and incorporated herein by reference. The sensors may also be optical sensors.

At selected positions along the streamer (10 in FIG. 1) a compass bird 44 may be affixed to the outer surface of the jacket 30. The compass bird 44 includes a directional sensor (not shown separately) for determining the geographic orientation of the segment 10A at the location of the compass bird 44. The compass bird 44 may include an electromagnetic signal transducer 44A for communicating signals to a corresponding transducer 44B inside the jacket 30 for communication along the conductor cable 40 to the recording system (16 in FIG. 1). Measurements of direction are used, as is known in the art, to infer the position of the various sensors in the segment 10A, and thus along the entire length of the streamer (10 in FIG. 1). Typically, a compass bird will be affixed to the streamer (10 in FIG. 1) about every 300 meters (every four segments 10A). One type of compass bird is described in U.S. Pat. No. 4,481,611 issued to Burrage and incorporated herein by reference.

In the present embodiment, the interior space of the jacket 30 may be filled with a material 46 such as buoyancy void filler ("BVF"), which may be a curable, synthetic urethane-based polymer. The BVF 46 serves, to exclude fluid (water) from the interior of the jacket 30, to electrically insulate the various components inside the jacket 30, to add buoyancy to a streamer section and to transmit seismic energy freely through the jacket 30 to the sensors (in sensor holders 32). The BVF 46 in its uncured state is essentially in liquid form. Upon cure, the BVF 46 no longer flows as a liquid, but instead becomes substantially solid. However, the BVF 46 upon cure retains some flexibility to bending stress, substantial elasticity, and freely transmits seismic energy to the sensors (in sensor holders 32). It should be understood that the BVF used in the present embodiment only is one example of a gel-like substance that can be used to fill the interior of the streamer. Other materials could be also used. For example, heating a selected substance, such as a thermoplastic, above its melting point, and introducing the melted plastic into the interior of the jacket 30, and subsequent cooling, may also be used in a streamer according to the invention. Oil or similar material may also be used to fill the interior of the streamer.

The sensor spacers 32, as explained in the Background section herein, are typically molded from a rigid, dense plastic to better protect the seismic sensors therein from damage during handling and use. An exterior configuration of the holder 32 is preferably such that the holder 32 fits snugly within the jacket (30 in FIG. 2). In various embodiments of the invention, the sensor spacers may also provide directional acoustic isolation between the BVF 46 and the sensor therein. Referring to FIG. 3, one embodiment of a sensor holder 32 having a sensor 56 therein will be explained. The sensor holder 32 is shown in oblique view in FIG. 3 to illustrate some of the features. The sensor holder 32, as explained above may be molded from rigid, dense plastic to provide an enclosure for the seismic sensor 56. The holder 32 may include diametrically opposed, longitudinally extending passages 50, 52. Longitudinal as used herein means along the length of or essentially parallel to the axis of the streamer segment. One of the passages 50 may be used for through passage of the cable (40 in FIG. 2) and may extend from one longitudinal end of the holder 32 to the other end. The other passage 52 may provide an enclosure for the sensor 56. The sensor 56 may be a hydrophone or other type of sensor as explained above. In the present embodiment, the passage 52 may be open only at one longitudinal end. The passage 52 may be closed at the other longitudinal end, either by a suitably shaped plug 52A, or by molding the holder 32 so that the passage 52 is closed at the one end. Closure at the one end provides acoustic isolation to the sensor 56 in one direction. The holder 32 may include other through passages 54 for the strength members (42 in FIG. 2). The embodiment shown in FIG. 3 provides location for the sensor 56 that is not coaxial with the streamer (10 in FIG. 1).

The sensor 56 may be mounted inside the passage by interference fit, or preferably by highly compressible elastomer rings (not shown) to provide acoustic isolation between the holder 32 and the sensor.

Another embodiment of sensor holder 32, shown in FIG. 4, provides a passage 62 for the sensor 56 that is centrally disposed about the axis of the streamer, such that the sensor 56 may be coaxial with the streamer (10 in FIG. 1). Similarly to the embodiment explained with reference to FIG. 3, the embodiment shown in FIG. 4 may provide that the passage 62 is closed at one longitudinal end and is open at the other end. The passage 62 may be closed at the one end by a suitably shaped plug 62A, or, as explained above with reference to FIG. 3, may be molded such that one end of the passage is closed. The embodiment in FIG. 4 also may include suitable passages 64 for the strength members (42 in FIG. 2). The embodiment shown in FIG. 4, just as the embodiment shown in FIG. 3, may provide acoustic isolation to the sensor 56 in one direction.

The effect of the structure of the sensor spacers 32 shown in FIG. 3 and FIG. 4 is to provide each individual sensor with sensitivity to acoustic energy traveling along one longitudinal direction and to make the sensor relatively insensitive to acoustic energy traveling in the opposite longitudinal direction, and orient the holders and sensors within the array according to a pattern that will give optimum symmetry after array forming. Sensitivity of each sensor to acoustic energy traveling other than longitudinally along the streamer will be substantially unaffected by the structure of the spacer. In a streamer segment made using sensor spacers according to the invention, an array of sensors, coupled in series and having sensor spacer openings arranged in certain patterns, may be formed to improve attenuation of noise transmitted through the BVF (46 in FIG. 2). Referring to FIG. 5, an example sensor array will be explained. As explained with reference to FIG. 1, an array 24 of sensors may include a plurality of, for example sixteen, individual sensors coupled in series and distributed along a distance of about 12½ meters. The example array 24 in FIG. 5 includes sixteen sensors disposed in spacers 32R, 32F made according to one or more of the embodiments explained above with reference to FIGS. 3 and 4. In the example shown in FIG. 5, some sensors in the array 24 are disposed in ones of the spacers having a sensor passage (52 in FIG. 3 or 62 in FIG. 4) that is closed at the aft or rear end. Such spacers are shown in FIG. 5 at 32R. Other ones of the sensors are disposed in ones of the spacers having sensor passages closed at the fore or front end, and such spacers are shown in FIG. 5 at 32F. Front and rear for purposes of the present explanation refer to the direction of towing, as shown in FIG. 5.

One possible arrangement of an array having alternatingly disposed front 32F and rear 32R closed spacers each having a sensor (56 in FIG. 3 or 4) therein is shown in FIG. 5. Other arrangements are possible, including having only one spacer oriented longitudinally opposite to the other spacers. However as a general principle, it is believed that the performance of an array using such sensor spacers as explained herein will be optimized when the front and rear closed spacers are disposed in a symmetric, alternating pattern such as shown in FIG. 5. The sensors are connected in series such that the array 24 functions as any other array known in the art with respect to certain types of noise imparted to the array 24. However, alternating longitudinal exposure direction of the sensors in the array is believed to reduce the effect on the sensors of longitudinally traveling pressure waves in the BVF (46 in FIG. 2). "Alternating" as used in this description and in the appended claims is intended to mean both the literal denotation of reversal of orientation between each successive sensor, as well as arrangements in which the orientation is reversed only between some of the sensors. The arrangement of sensors and/or spacers shown in FIG. 5, for example, is intended to fall within the scope of the word "alternating" as used herein.

Figure 6A:
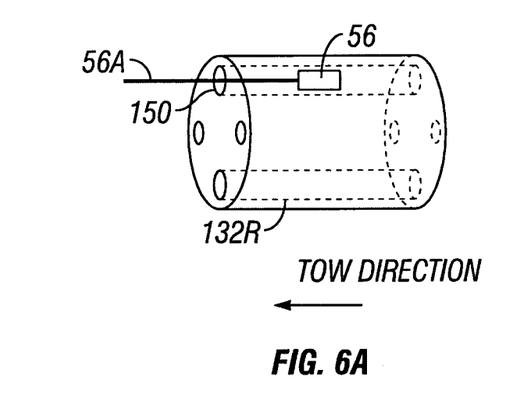
FIGS. 6A and 6B show rear facing and forward facing sensors, respectively, in respective sensor holders.

It has been determined by testing in the laboratory that hydrophones may have some longitudinal directionality to its response to pressure waves. Such longitudinal directionality appears to manifest itself by higher response amplitude to longitudinally traveling acoustic energy with the sensor oriented in one longitudinal direction along the streamer than along the other longitudinal direction. In some embodiments, the longitudinal orientation of at least one sensor in the array is different than the longitudinal orientation of the other sensors in the array. In some embodiments, the seismic sensor longitudinal orientation may alternate along the array. In one example, such alternating longitudinal orientation may be symmetric about a longitudinal center of the array. Other types of seismic sensors may be used in other implementations according to the present embodiment to ensure optimum symmetry after array forming, in the case such other sensors have longitudinal directionality. Referring to FIG. 6A, one orientation of a sensor 56 in a sensor holder 132R is shown to illustrate the foregoing. The sensor 56 is disposed in an opening 150 as previously explained. The sensor 56 is oriented such that its head end (opposite electrical or optical leads 56A) is disposed toward the aft end of the holder 132R, where "aft" is with respect to the tow direction. A corresponding, reverse-oriented sensor is shown at 56 in a "forward" sensor holder 132F FIG. 6B.

Figure 6B:
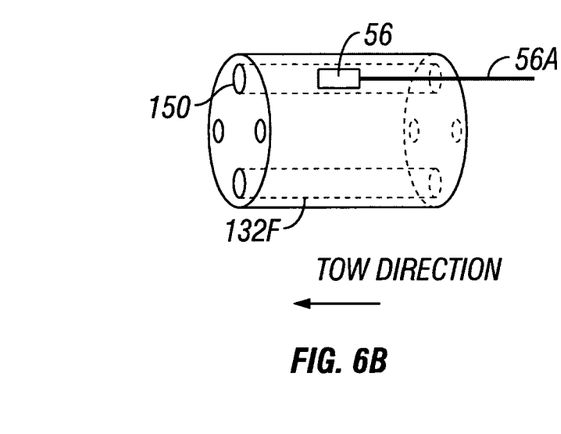
Figure 6C:
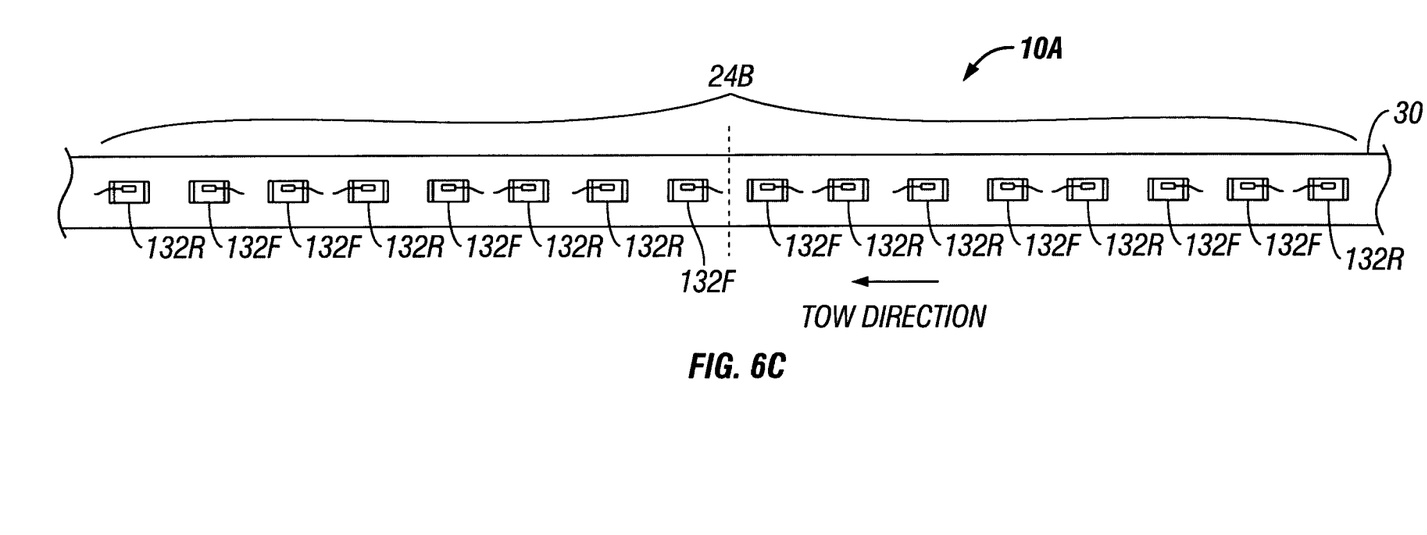
FIG. 6C shows an array of sensors using the sensors shown in FIGS. 6A and 6B.

The aft 132R and forward 132F sensor holders (with respectively oriented sensors in each holder) are shown in FIG. 6C in an array 24B. The array 24B shown in FIG. 6C is preferably symmetrically arranged about the longitudinal center line of the array 24B. The sensor holders 132F, 132R shown in FIGS. 6A through 6B may each include a plug in one end of the sensor passage as in FIGS. 3 and 4, or may each have a sensor passage open at both longitudinal ends. Thus, the arrangement shown in FIG. 6C may be in addition to or in substitution of the arrangement shown in FIG. 5.

Figure 7A:
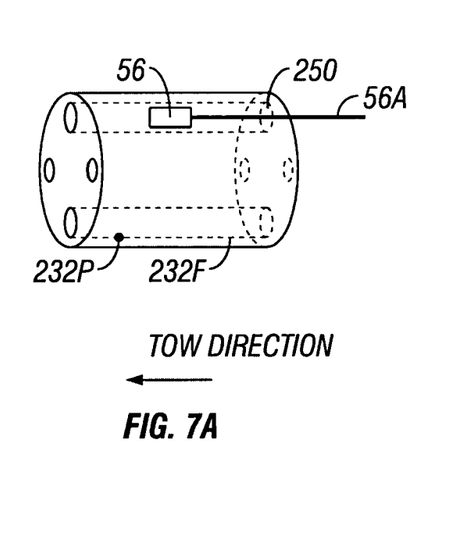
FIGS. 7A and 7B, show, respectively, forward oriented and aft oriented sensor holders.
Figure 7B:
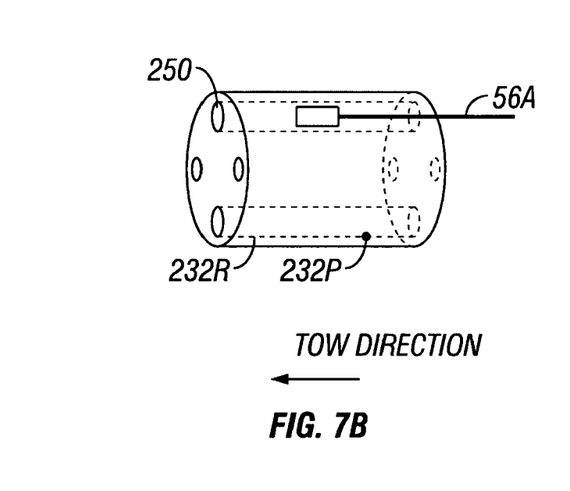
Figure 7C:
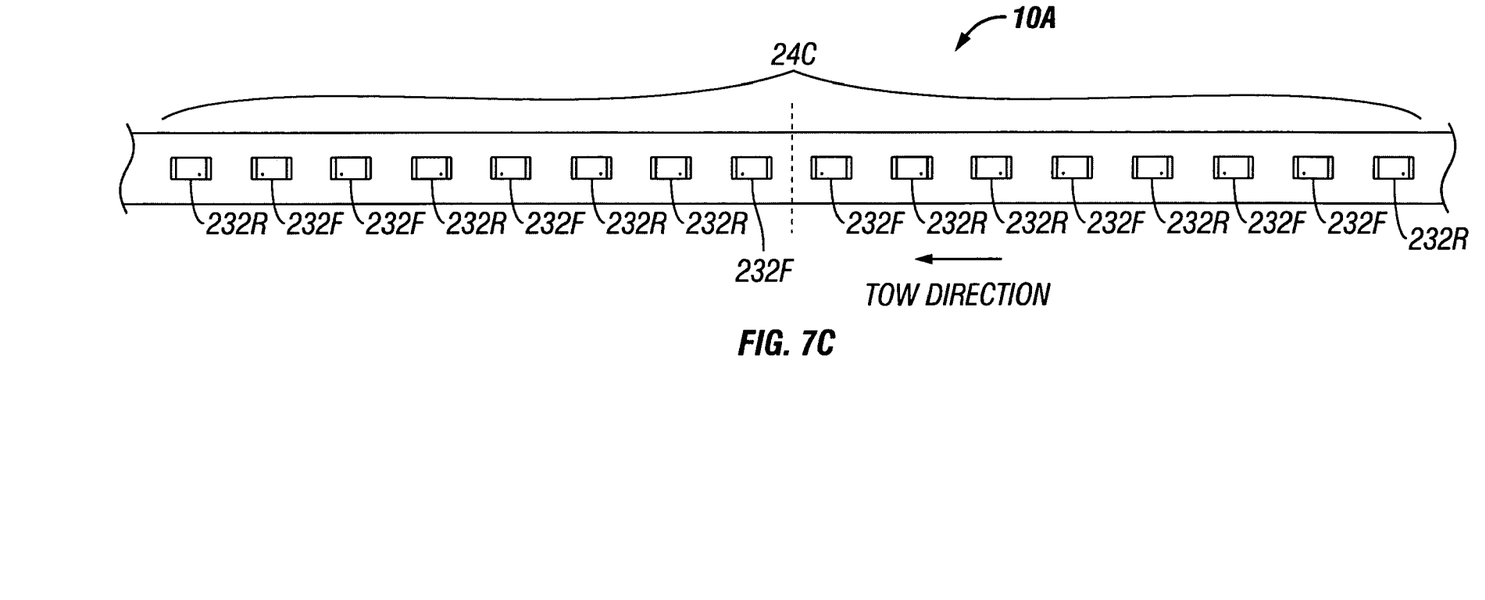
FIG. 7C shows an array using the sensor holders shown in FIGS. 7A and 7B.

FIG. 7A shows a sensor holder 232F as explained above with a through passage 250 for the sensor 56. The sensor holder 232F is indicated as having a particular orientation with respect to the tow direction based on a manufacturing geometry or other geometric reference. An example of a manufacturing geometric reference is an injection plug 232P that may form when a plastic device such as the sensor holder 232F is made by injection molding. The geometric reference may be provided to enable the user to identify the longitudinal orientation of the sensor holder 232F if the remaining features of the sensor holder 232F are substantially longitudinally symmetric. If the sensor holder is not longitudinally symmetric, then no additional reference is required to identify the longitudinal orientation of the sensor holder 232F. A corresponding, longitudinally reverse-oriented sensor holder 232R is shown in FIG. 6B. The sensor holders 232F, 232R shown in FIGS. 7A and 7B may be used to form an array, as shown at 24C in FIG. 7C. The array 24C may include longitudinally forward (232F) and longitudinally aft (232R) oriented sensors, preferably in a symmetric arrangement with respect to a longitudinal center line of the array 24C. The embodiments shown in FIGS. 7A through 7C are intended to account for the possibility that even apparently longitudinally symmetric sensor holders may have some longitudinal directionality to their acoustic response. The arrangement shown in FIG. 7C may be used alone, or in conjunction with the arrangement shown in FIG. 5 or FIG. 6C.

A streamer made using sensor spacers and sensor arrays as described herein may provide substantially reduced effect of noise related to axial vibrations than streamers made according to structures known in the art prior to the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A seismic streamer, comprising:
   at least one array of seismic sensors disposed at longitudinally spaced apart locations, a longitudinal orientation of directional sensitivity of at least one sensor in the array being opposite to a longitudinal orientation of directional sensitivity of other sensors in the array, signal outputs from the sensors in the array combined to generate an array output signal.

2. The streamer of claim 1 further comprising:
   a jacket covering an exterior of the streamer;
   at least one strength member extending along the length of the jacket, the strength member disposed inside the jacket; and
   an acoustically transparent material filling void space in the interior of the jacket.

3. The streamer of claim 2 wherein the material comprises curable, synthetic urethane-based polymer introduced into the jacket in liquid form and cured thereafter.

4. The streamer of claim 1 wherein the orientations of the sensors are arranged longitudinally symmetrically about a longitudinal center of the at least one array.

5. The streamer of claim 1 wherein the at least one array comprises hydrophones.

6. The streamer of claim 1 wherein each sensor is disposed in a holder comprising a passage therein for the sensor, the passage closed at one longitudinal end.

7. The streamer of claim 1 wherein the longitudinal orientations of the sensors alternates along the array.

8. The streamer of claim 1 wherein each sensor is disposed in a holder comprising a longitudinal passage therein for the sensor, the passage closed at one longitudinal end, the closed longitudinal end of at least one holder oriented opposite to a closed longitudinal end of the other holders.

9. The streamer of claim 8 wherein the orientation of the longitudinally closed ends of the holders alternates along the array.

10. The streamer of claim 9 wherein the longitudinally closed ends are arranged symmetrically about a longitudinal center of the array.

11. The streamer of claim 1 wherein each sensor is disposed in a sensor holder, a longitudinal orientation of at least one sensor holder opposite to a longitudinal orientations of the other sensor holders.

12. The streamer of claim 11 wherein the sensor holders are longitudinally alternatingly oriented.

13. The streamer of claim 11 wherein the sensor holders are arranged longitudinally symmetrically about a longitudinal center of the array.

14. A seismic streamer, comprising:
   a jacket covering an exterior of the streamer;
   at least one strength member extending along the length of the jacket, the strength member disposed inside the jacket;
   at least one array of sensors disposed inside the jacket along the strength member, each sensor in the at least one array disposed in a sensor holder, each sensor holder configured to expose the sensor to pressure variations in the interior of the jacket in only one longitudinal direction and to acoustically isolate the sensor from pressure variations from the other longitudinal direction, the direction of exposure of at least one sensor holder being opposite to a direction of exposure of the other holders in the array, whereby a sensor disposed in said at least one sensor holder has a longitudinal orientation of directional sensitivity opposite to a longitudinal orientation of direction sensitivity of other sensors in the array disposed in sensor holders in which the direction of exposure is opposite to the direction of exposure of said at least one sensor holder; and
   an acoustically transparent material filling void space in the interior of the jacket.

15. The streamer of claim 14 wherein the at least one array is arranged such that directions of exposure of the holder are symmetric about a longitudinal center of the at least one array.

16. The streamer of claim 14 wherein the material comprises curable, synthetic urethane-based polymer introduced into the jacket in liquid form and cured thereafter.

17. The streamer of claim 14 wherein the sensors in the at least one array comprise hydrophones coupled in series.

18. The streamer of claim 14 wherein each sensor holder comprises a passage for a respective sensor, the passage closed at one longitudinal end.

19. The streamer of claim 14 where in the direction of exposure alternates along the array.

20. The streamer of claim 14 wherein a longitudinal orientation of at least one sensor is opposite to longitudinal orientations of the other sensors in the array.

21. The streamer of claim 19 wherein longitudinal orientations of the sensors alternate along the array.

22. The streamer of claim 20 wherein the longitudinal orientations of the sensors are arranged symmetrically with respect to a longitudinal center of the array.

23. A seismic streamer, comprising:
   a jacket covering an exterior of the streamer;
   at least one strength member extending along the length of the jacket, the strength member disposed inside the jacket;

at least one array of sensors disposed inside the jacket along the strength member, each sensor in the at least one array disposed in a sensor holder, the sensors having signal outputs thereof combined to generate an array output signal, at least one sensor holder oriented longitudinally opposite to orientation of other sensor holders in the array, whereby a sensor disposed in said at least one sensor holder has a longitudinal orientation of directional sensitivity opposite to a longitudinal orientation of direction sensitivity of other sensors in the array disposed in sensor holders in which the direction of exposure is opposite to the direction of exposure of said at least one sensor holder; and an acoustically transparent material filling void space in the interior of the jacket.

24. The streamer of claim 21 wherein the at least one array is arranged such that orientations of the holder are symmetric about a longitudinal center of the at least one array.

25. The streamer of claim 21 wherein the material comprises curable, synthetic urethane-based polymer introduced into the jacket in liquid form and cured thereafter.

26. The streamer of claim 21 wherein the sensors in the at least one array comprise hydrophones.

27. The streamer of claim 21 wherein each sensor holder comprises a passage for a respective sensor, the passage closed at one longitudinal end.

28. The streamer of claim 21 where in the orientation of the sensor holders alternates along the array.

29. The streamer of claim 21 wherein a longitudinal orientation of at least one sensor is opposite to an orientation of the other sensors in the array.

30. The streamer of claim 27 wherein longitudinal orientations of the sensors alternate along the array.

31. The streamer of claim 28 wherein the longitudinal orientations of the sensors are arranged symmetrically with respect to a longitudinal center of the array.

* * * * *